United States Patent [19]
Kotte

[11] 3,979,966
[45] Sept. 14, 1976

[54] CLUTCH DEVICE FOR EITHER INTERMITTENT OR CONTINUOUS DRIVING OF PERFORATED FILM

[75] Inventor: Jan Jakob Kotte, Riethoven-Walik, Netherlands

[73] Assignee: Kinoton GmbH, Munich, Germany

[22] Filed: Aug. 4, 1975

[21] Appl. No.: 601,474

[30] Foreign Application Priority Data
Aug. 8, 1974 Germany............................ 2438282

[52] U.S. Cl................................... 74/436; 74/10.8; 74/84 R; 74/820
[51] Int. Cl.².................. F16H 55/04; F16H 35/18; F16H 27/04; B23B 29/24
[58] Field of Search ............... 74/436, 10.8, 820, 84

[56] References Cited
UNITED STATES PATENTS

| | | | |
|---|---|---|---|
| 1,174,249 | 3/1916 | Gall | 74/436 |
| 1,803,465 | 5/1931 | Dina | 74/436 |
| 3,397,585 | 8/1968 | McGowan | 74/436 X |
| 3,853,015 | 12/1974 | Bertozzi et al. | 74/436 X |

FOREIGN PATENTS OR APPLICATIONS
1,200,436  7/1970  United Kingdom................... 74/436

Primary Examiner—Leonard H. Gerin
Attorney, Agent, or Firm—Anthony J. Casella

[57] ABSTRACT

Perforated information-bearing media in strip form, for example film in cinematographic devices, is driven either intermittently or continuously. The normally used Geneva stop (Maltese cross), which is connected via an output shaft to the sprocket engaging in the film perforations, can be disengaged from the continuously rotarily driven pin disc by axial displacement of either the Geneva stop of the pin disc effected by clutch means. For rewinding or unwinding the film at continuous high speed simultaneously with said clutch-disengagement between Geneva stop and pin disc, clutch members of a continuously driven, on the output shaft axially displaceable and free running clutch disc, engage in the slots or recesses in the Geneva stop at the position of the Geneva stop which corresponds to the frame standstill.

7 Claims, 1 Drawing Figure

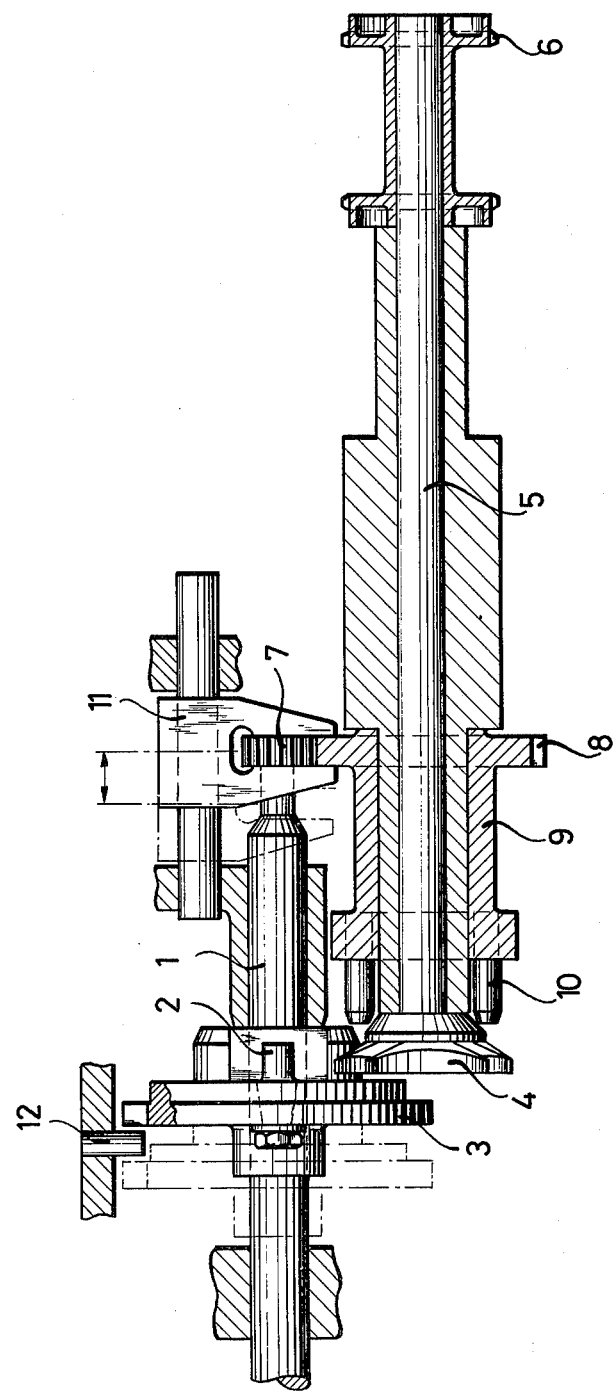

CLUTCH DEVICE FOR EITHER INTERMITTENT OR CONTINUOUS DRIVING OF PERFORATED FILM

FIELD OF THE INVENTION

The invention relates to a clutch device for either intermittent or continuous driving of perforated information-bearing media in strip form, for example film in a film projector.

DESCRIPTION OF THE PRIOR ART:

German Patent Application laid open under the No. 2 218 748 has made known a clutch device for a Geneva stop drive wherein the Geneva stop can be shifted along its axis to two positions corresponding to the engaged and disengaged positions.

On the other hand, German Patent Specification No. 276,455 shows how the pin disc can be mounted displaceably relative to the Geneva stop and how a transmisson designed as a cam allows the striker of the pin disc to be disengaged only occasionally from the Geneva stop.

In these known devices, the drive leading to the feed drum or sprocket is interrupted when the Geneva stop is disengaged.

The basic problem is to provide a clutch device which selectively allows the film inserted in a cinematographic device to be unwound and rewound at high continuous speed.

SUMMARY OF THE INVENTION

A drive mechanism having a Geneva stop (Maltese cross) for intermittent transportation is used to project cinema films because they are distinguished by a long service life and great smoothness as well as precise running.

However, the intermittent driving of the feed drum or sprocket via the stepwise driven Maltese cross is not necessary and even unwanted when the film is going to be rewound or unwound at high speed. If this is done, with film inserted, via the stepwise transported feed drum or sprocket, inertia forces occur upon acceleration and retardation of each frame, which do not permit the speed to be raised during rewinding or unwinding and which even lead to unnecessary wear on transmission and film at normal speed.

An object of this invention is to arrange a clutch device for a drive meachanism having a Geneva stop which enables a continuous rotation of the Geneva stop carrying output shaft at relative high speed when the intermittent drive producing pin disc is moved away from the Geneva stop for disengagement with it.

This displacing motion and this continuous rotation of the output shaft are initiated at a position of the Gevena stop which corresponds to frame standstill.

The clutch device of the present invention comprises a clutch plate which is driven continuously, runs freely and is axially displaceable on the output shaft. At this clutch plate clutch members are formed adjacent to the Geneva stop in sufficient distance from said Geneva stop but suitably projecting for engaging in the sots or recesses in the Geneva stop simultaneously with the clutch-engagement-interrupting displacing motion at a position of the Geneva stop which corresponds to frame standstill.

Due to the independent continuous rotation of the output shaft when disengaged from the intermittent drive producing pin disc, no inertia forces are translated to the film engaging sprocket, which otherwise occur upon acceleration and retardation of each frame, and consequently the speed during winding and rewinding can exceed the projection speed by two to three times. This permits operationally reliable and safe automation of the film projection.

The clutch plate which is designed to transmit its continuous speed of rotation selectively to the Geneva stop can be caused to rotate by its own drive. According to a modified embodiment of the invention, however, it can also be driven by the driving shaft for the pin disc through a reduction gear transmission. It is advantageous here if one of the gear wheels of the gear transmission is connected to the clutch plate and the gear wheel meshing with it is mounted on the driving shaft for the pin disc, both gear wheels of the gear transmission being capable of limited axial displacement by a switching fork.

BRIEF DESCRIPTION OF THE DRAWINGS

The single FIGURE of the drawings is a schematic view of the clutch device incorporating the improved clutch means of the invention.

DESCRIPTION OF THE PREFERRED EMBODIMENT

A pin disc 3 furnished with a striker 2 is mounted on a regularly rotating driving shaft 1. Striker 2 serves to transport intermittently a Geneva stop 4 which is furnished with four slots or recesses and which is mounted on output shaft 5. Hence, the Geneva stop is actuated once for every revolution of driving shaft 1, causing output shaft 5 to be turned by an angle of 90° each time. These periodic stepping motions of Geneva stop 4 are transmitted to a feed drum or sprocket 6 which is fastened to output shaft 5 and which steps the film between every two frames.

A gear wheel 7 is mounted on driving shaft 1, being fixed to it. Said gear wheel 7 meshes with a gear wheel 8 moulded on to a clutch plate 9 running freely on output shaft 5 via an interposed bearing bush. On the side facing towards the Geneva stop clutch plate 9 is equipped with clutch members 10 which engage in the slots or recesses in the Geneva stop when the clutch plate is moved axially in the direction of the Geneva stop.

The clutch plate is moved axially by a switching fork 11 which can be shifted by about ± 0.2 inch parallel to the driving and output shafts and which covers both gear wheel 7 mounted on driving shaft 1 and gear wheel 8 meshing with it. A motion directed to the left, looking at the drawing plane, shifts driving shaft 1 and pin disc 3 correspondingly to the left, causing the pin disc to be disengaged from the Geneva stop, and clutch plate 9 moves simultaneously to the left, causing clutch members 10 to drop into the slots in the Geneva stop when the latter ist at a position corresponding to frame standstill.

Hence, the Geneva stop is permanently engaged, either with pin disc 3 or clutch plate 9.

In order that engagement is made with the clutch plate when the Geneva stop is at a position corresponding to frame standstill, means are provided by which the axial displacement of switching fork 11 is only initiated as a function of a given angular position of striker 2 on the pin disc. Such means may consist of a mark or stop 12 which automatically initiates axial displacement of switching fork 11 when the striker goes past.

Instead of employing mechanically initiated displacement of the switching fork it is also possible in a modified embodiment to make provision for electromagnetic actuation, it being possible to call upon the assistance of spring force at the moment of initiation. In order to synchronize clutch engagement here with the angle of the striker, said angle can be registered by electro-optical means.

Instead of employing a fork bush acting as dog clutch, any given positive-contact clutch is imaginable which engages in the slots or recesses in the Geneva stop, as long as clutch engagement is made in rotary synchronism with the position of the striker. The number of clutch members or dog pins is arbitrary.

The clutch device according to the present invention is not limited to the preferred embodiment, and to the use in cinematographic devices. It is also possible to use such a clutch device in other systems for driving of perforated information-bearing media in strip form, for example data tapes or data cards carrying information in perforated form and being driven intermittent during recording or reading the information and being continuously driven during winding or rewinding.

I claim:

1. Clutch device for either intermittent or continuous driving of perforated information-bearing media in strip form, for example film in a cinematographic device, having a Geneva stop (Maltese cross) drive, the Geneva stop is connected via an output shaft to the sprocket engaging in the film perforations and is disengageable from the continuously rotarily driven pin disc producing intermittent drive with the clutch engaged, which disengagement is produced by axial displacement of either the Geneva stop or the pin disc, the combination comprising:

a clutch plate running freely and being axially displaceable on the output shaft is driven continuously, clutch members formed at the clutch plate adjacent to the Geneva stop in sufficient distance from said Geneva stop but suitably projecting for engaging in the slots or recesses in the Geneva stop simultaneously with the clutch-engagement-interrupting displacing motion at a position of the Geneva stop which corresponds to the frame standstill.

2. Clutch device of claim 1, wherein the clutch plate is drivingly connected to the driving shaft for the pin disc through a reduction gear transmission.

3. Clutch device of claim 1, wherein one of the gear wheels of the reduction gear transmission is connected to the clutch plate and the gear wheel meshing with it is attached to the driving shaft for the pin disc and wherein both gear wheels of the gear transmission are capable of limited axial displacement by a switching fork.

4. Clutch device of claim 1, wherein the clutch plate together with the clutch members are designed as a dogclutch.

5. Clutch device of claim 4, wherein a fork bush is moulded onto the clutch plate, which fork bush has clutch members which engage in opposite slots or recesses upon clutch engagement with the Geneva stop.

6. Clutch device of claim 1, wherein the axial displacement which permits either step-by-step or continuous transmission of motion is initiated as a function of the angular position of the striker on the pin disc.

7. Clutch device of claim 6, wherein axial displacement is initiated automatically when the striker passes a mark or stop.

* * * * *